Patented June 8, 1954

2,680,762

UNITED STATES PATENT OFFICE 2,680,762

PREPARATION OF 2:6-DIIODODIPHENYL ETHERS

George Thomson Dickson, London, England, assignor to Glaxo Laboratories Limited, Greenford, England, a British company No Drawing. Application August 28, 1950, Serial No. 181,925

Claims priority, application Great Britain September 8, 1949

14 Claims. (Cl. 260—471)

1

This invention is concerned with improvements in or relating to the preparation of 2:6-diiododiphenyl ethers of the general formula

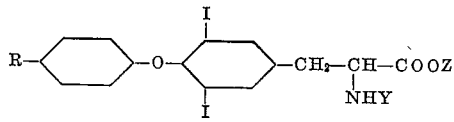

where Z is hydrogen or an alkyl group containing not more than four carbon atoms, Y is hydrogen or a group used to protect an amino group such as an acetyl or benzoyl group and R is a hydroxyl group or a hydroxyl group protected by a group removable therefrom such as a methyl, ethyl, benzyl, acetyl or benzoyl group. Compounds of this general formula are useful in the synthesis of thyroxine.

The copending application of Edward T. Borrows et al., Serial No. 54,583, filed October 14, 1948, now Patent 2,600,835 granted June 17, 1952, describes a process for the preparation of 2:6-dihalogenodiphenyl ethers of the kind specified therein (which include the compounds of the above-mentioned general formula) in which the corresponding diaminodiphenyl ether is treated in solution in glacial acetic acid with concentrated sulphuric acid and a suitable nitrite and the resulting tetrazo compound subsequently decomposed with a suitable halide as defined in the said application in the presence of water.

We have now found that the decomposition of the above mentioned tetrazo compound takes place more smoothly and in higher yield when carried out in the presence of a mixture of water and a water-immiscible solvent in which the required diiododiphenyl ether is soluble. In this way the diiododiphenyl ether is extracted from the aqueous solution thus minimizing the risk of decomposition and other side reactions which lead to the formation of tarry by-products.

According to the present invention therefore we provide a process for the preparation of 2:6-diiododiphenyl ethers of the general formula

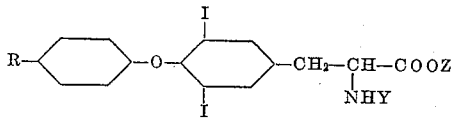

in which a diaminodiphenyl ether of the general formula

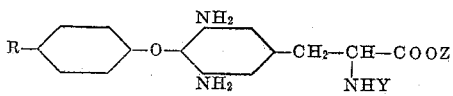

2

(where Z and Y have the above stated meanings) is treated in solution in glacial acetic acid and/or syrupy phosphoric acid with concentrated sulphuric acid and a suitable nitrite as herein defined in the absence of water and the resulting tetrazo compound is decomposed with an aqueous solution of an alkali metal iodide in the presence of a water-immiscible organic solvent in which the 2:6-diiododiphenyl ether is soluble.

According to a feature of the invention we prefer to have free iodine present during the decomposition of the tetrazo compound. Thus for example this decomposition may be satisfactorily effected by means of an aqueous solution of sodium triiodide ($NaI_3$).

The term a "suitable nitrite" as used herein has the meaning assigned to it in the aforementioned application, namely an inorganic nitrite preferably sodium nitrite, or an organic nitrite derived from an aliphatic alcohol having less than six carbon atoms, for example amyl nitrite.

The water-immiscible solvent should be stable to the action of mineral acids and diazonium compounds and should readily dissolve the required diiododiphenyl ethers; examples of such solvents are chloroform, tetrachloroethane, methylene dichloride, benzene, chlorobenzene and ethylene dichloride. Among solvents which are unsuitable for the process are petroleum ether, carbon disulphide, and carbon tetrachloride since the diiododiphenyl ethers are only sparingly soluble in these solvents. In general we prefer to use a solvent having a boiling point of not less than 40° C.

The examples of the said specification describe the first or tetrazotisation stage of the process by adding a solution of the diamine in acetic acid to a solution of the suitable nitrite in the sulphuric acid or alternatively by adding a solution of the nitrite in sulphuric acid to a solution of the diamine in a mixture of acetic acid and sulphuric acid; we have found according to a further feature of the present invention that higher yields are obtained at the tetrazotisation stage of the process by adding a solution of the diamine in solution in a mixture of sulphuric acid and acetic acid and/or syrupy phosphoric acid to a solution of the nitrite in the said mixed acids.

The tetrazotisation stage of the present process is preferably carried out at a temperature within the range of from −5 to 20° C. and it should be emphasized that it is essential to avoid the presence of water during this reaction.

It should be noted that the products prepared according to the present process contain an asymmetric carbon atom and accordingly exist in optically active forms, and we have found that the use of optically active diaminodiphenyl ethers in the process according to the invention leads to the formation of optically active diiododiphenyl ethers. This fact is of importance in the preparation of intermediates for the synthesis of L-thyroxine which compound has greater physiological activity than racemic thyroxine. The invention accordingly comprises the preparation of L-diiododiphenyl ethers by the use as starting material of L-diaminodiphenyl ethers.

The diaminodiphenyl ethers required as starting materials in the present process may, for example, be prepared by the hydrogenation of the corresponding dinitrodiphenyl ethers prepared according to the copending application of Edward T. Borrows et al. Serial No. 157,855, filed April 26, 1950, now Patent 2,591,776 granted April 8, 1952, which application was a continuation-in-part of the copending application of Edward T. Borrows et al., Serial No. 54,585, filed October 14, 1948, and now abandoned. Where it is desired to use starting materials in which Z and/or Y is/are hydrogen these materials may be prepared by hydrolysis of suitable compounds prepared according to the said application, for example as described in Examples 2 and 3 of the present application.

In order that the invention may be well understood the following examples are given only as illustrations:

EXAMPLE 1

(a) *3:5 - diamino - 4 - (4' - methoxyphenoxy) - N - acetyl - L - phenylalanine ethyl ester.*—3:5 - dinitro - 4 - (4' - methoxyphenoxy) - N - acetyl - L - phenylalanine ethyl ester (106 g.) in methanol (1 l.) was hydrogenated at room temperature and 70 atmospheres pressure in the presence of palladised charcoal (10%; 6 g.). During all the subsequent manipulations air was excluded by means of carbon dioxide. While warm (50° C.) the solution was filtered, the catalyst was washed with warm methanol (200 ml.) and the combined filtrate and washings were evaporated to dryness under reduced pressure, the temperature being kept as low as possible. The residual gum was dissolved in warm alcohol (ca. 100 ml.). On cooling, the diamine (87 g. 95%) separated as white crystals. Material obtained from the first runs melted at 73–75° C., resolidified at a higher temperature and finally melted at 135–136° C. On standing, the crystals changed spontaneously to the high melting form and later batches have consisted only of this form. (Found: C, 61.8; H, 6.4; N, 10.65. $C_{20}H_{25}O_5N_3$ requires C, 62.0; H, 6.45; N, 10.85% $[\alpha]_D^{26°} = +42.4°$ (c. 0.94 in dioxan).

(b) *3:5 - diiodo - 4 - (4' - methoxyphenoxy) - N - acetyl - L - phenylalanine ethyl ester.*—A solution of 3:5-diamino-4-(4'-methoxyphenoxy) - N - acetyl - L - phenylalanine ethyl ester (40 g.) in acetic acid (80 ml.) was added to concentrated sulphuric acid (40 ml.) with stirring, the temperature being kept between 10 and 20° C. This solution was added dropwise during about 2 hours to a stirred and cooled (−2 to 0° C.) solution prepared by the cautious dilution with glacial acetic acid (250 ml.) at about 0° C., of a solution of sodium nitrite (17.5 g.) in concentrated sulphuric acid (125 ml.). When the addition of the diamine solution was complete, the orange-coloured solution was stirred for one hour at 0° C. and was then added fairly rapidly from a cooled dropping funnel to a well stirred solution of sodium iodide (80 g.), iodine (67 g.) and urea (10 g.) in water (1300 ml.) covering a layer of chloroform (250 ml.). No attempt was made to cool the mixture, the temperature of which rose to about 40° C. Stirring was continued for one hour after the addition had been completed and the chloroform layer was then separated. The aqueous layer, together with some undissolved iodine, was washed twice with chloroform and the combined chloroform solutions were washed with water. Free iodine was removed from the chloroform solution by covering it with an aqueous solution of sodium sulphate (100 g.) and passing in sulphur dioxide. The solution was again washed with water and evaporated to dryness, leaving a solid residue. After crystallisation from alcohol, the diiodo compound melted at 143–144° C. (Found: C, 39.4; H, 3.5; N, 2.3; I, 41.8.) $C_{20}H_{21}O_5NI_2$ requires C, 39.4; H, 3.5; N, 2.3; I, 41.7% $[\alpha]_D^{23°} = +30.8°$ (c. 6.04 in dioxan). Yield 51.5 g. 82%.

EXAMPLE 2

(a) *3:5 - dinitro - 4 - (4' - methoxyphenoxy) - L - phenylalanine*

3:5 - dinitro - 4 - (4' - methoxyphenoxy) - N - acetyl-L-phenylalanine ethyl ester (50 g.) was refluxed for two hours with a mixture of concentrated hydrochloric acid (100 ml.) and glacial acetic acid (100 ml.). On cooling orange needles separated. These were well washed with water and recrystallised from 50% aqueous acetic acid plus 5 ml. concentrated hydrochloric acid yielding pale yellow needles (35 g. 83%) of M. P. 235° (decomposition). Found, C, 50.7; H, 3.97; N, 10.9 requires $C_{16}H_{15}O_8N_3$; C, 51.0; H, 4.0; N, 11.1 $[\alpha]_D^{20} = +27°$ (1% in equal volumes of N. hydrochloric acid and alcohol).

(b) *3:5 - diiodo - 4 - (4' - methoxyphenoxy) - L - phenylalanine*

3:5 - dinitro - 4 - (4' - methoxyphenoxy) - L - phenylalanine (10 g.) was reduced to the "3:5-diamine" by shaking under hydrogen at atmospheric pressure, with glacial acetic acid (70 ml.) and 10% palladium on charcoal catalyst (1 g.). Without filtering off the catalyst, concentrated sulphuric acid (10 ml.) was added dropwise with stirring and external cooling, followed by a further quantity of glacial acetic acid (15 ml.).

Meanwhile a solution of nitrosyl-sulphuric acid was prepared by the portionwise addition of sodium nitrite (4.5 g.) to stirred and cooled concentrated sulphuric acid (32 ml.). This latter solution was cooled to 5° C. and the previously prepared solution of the diamine in the mixed sulphuric and acetic acids added dropwise with vigorous stirring and external cooling, the temperature being kept below 5° C. Stirring was continued for a further hour at 5°, urea (1 g.) was then added and the dark orange solution added dropwise to a stirred solution of sodium iodide (20 g.) and iodine (17 g.) in water (350 ml.) with chloroform (100 ml.). The charcoal catalyst was removed by filtration. Treatment of the filtrate with 20% aqueous sodium metabisulphite, to remove free iodine, precipitated the product as a fine buff powder (9.0 g.) of M. Pt. 190° C. (decomposition). Recrystallisation, three times, from approximately equal volumes of glacial acetic acid and 2N. hydrochloric acid yielded off white needles (2.8 g. 20%) of M. Pt. 227°–228° (decomposition. Found: N, 2.3; I, 49.1. $C_{16}H_{15}O_4NI_2$ requires N, 2.60; I, 47.1. $[\alpha]_D^{20} = +19°$ (1% solution in equal volumes of N. hydrochloric acid and alcohol.

EXAMPLE 3

(a) *3:5-dinitro-4-(4'-methoxyphenoxy)-N-acetyl-L-phenylalanine*

3:5-dinitro-4-(4'-methoxyphenoxy)-N-acetyl-L-phenylalanine ethyl ester (10 g.) was dissolved in industrial methylated spirit (200 ml.) and N. sodium hydroxide solution (100 ml.) added at a temperature of 20° C. The mixture was allowed to stand for half an hour and was then acidified with 2N. hydrochloric acid to Congo Red. The copious yellow precipitate obtained was filtered, water washed and dissolved in aqueous sodium bicarbonate solution (20 g. in 500 ml.). This solution was extracted with chloroform twice, to remove any unchanged ester, then acidified to Congo Red with 2N. hydrochloric acid. The yellow precipitate obtained was filtered, water washed and recrystallised from aqueous alcohol yielding yellow needles (4.5 g.–48%) of M. Pt. 105°–7°. Found: N, 9.85. $C_{18}H_{17}O_9N_3$ requires N, 10.02. $[\alpha]_D^{20} = +76°$ (1% in chloroform).

(b) *3:5-diamino-4-(4'-methoxyphenoxy)-N-acetyl-L-phenylalanine*

3:5-dinitro-4-(4'-methoxyphenoxy)-N-acetyl-L-phenylalanine (9 g.) was reduced to the diamine by shaking under hydrogen at atmospheric pressure with 10% palladium on charcoal catalyst (0.75 g.) and methanol (70 ml.) a theoretical uptake of hydrogen was observed in ½ hour. The catalyst was removed by filtration and the solvent removed under reduced pressure. The residual white solid was recrystallised from alcohol yielding hard white granular crystals (3.4 g. 44%) of M. Pt. 120° C. Found: N, 11.0; $C_{18}H_{25}O_4N_3$ requires N, 11.7. $[\alpha]_D^{20} = +38° - 1\%$ in $CHCl_3$.

(c) *3:5-diiodo-4-(4'-methoxyphenoxy)-N-acetyl-L-phenylalanine*

A solution of nitrosylsulphuric acid was prepared by the careful addition of sodium nitrite (1 g.) to well stirred concentrated sulphuric acid (6 ml.). After cooling to <20° C. the solution was diluted with a previously prepared and cooled mixture of glacial acetic acid (12 ml.) and concentrated sulphuric acid (2 ml.), the temperature being kept <20° by external cooling. After cooling to 5° C. a previously prepared solution of 3:5-diamino-4-(4'-methoxyphenoxy)-N-acetyl-L-phenylalanine (2 g.) in glacial acetic acid (4 ml.) was added dropwise with vigorous mechanical stirring, the temperature being kept <5°. After stirring for a further half hour urea (1 g.) was added and the solution added in a very fine stream to a mechanically stirred solution of sodium iodide (4.0 g.) and iodine (3.5 g.) in water (65.0 ml.) and chloroform (75 ml.). The product separated as a very dark coloured tar which after separation of the aqueous layer was dissolved up in a further quantity of warm chloroform (500 ml.). Removal of free iodine was effected by washing with aqueous sodium metabisulphite solution whereupon some of the product was precipitated as a pale pink coloured solid. This was filtered off and added to the residue obtained by removal of the solvent from the chloroform layer. Recrystallisation of this residue from a large volume of chloroform yielded very fine pale buff crystals (1.0 g. 31%) of M. Pt. 190°–2°. Found: C, 37.4; H, 2.94; N, 2.5; I, 44.4. $C_{18}H_{17}O_5NI_2$ requires C, 37.2; H, 2.93; N, 2.4; I, 43.7. $[\alpha]_D^{20} = +30° - \frac{1}{2}\%$ in alcohol.

EXAMPLE 4

(a) *3:5-diamino-4-(4'-methoxyphenoxy)-L-phenylalanine ethyl ester hydrochloride*

3:5-dinitro-4-(4'-methoxyphenoxy)-L-phenylalanine ethyl ester hydrochloride (7.8 g.) was reduced to the diamine in the same manner as described for 3:5-diamino-4-(4'-methoxyphenoxy)-N-acetyl-L-phenylalanine. Recrystallisation of the crude product from alcohol yielded white crystals (2.9 g. 43%) of M. Pt. 211–212° (decomposition). Found: C, 56.6; H, 6.02; N, 10.64; Cl, 9.52. $C_{18}H_{23}O_4N_3.HCl$ requires C, 56.6; H, 6.02; N, 11.00; Cl, 9.30 $[\alpha]_D^{20} = -23° - (\frac{1}{2}\%$ in alcohol).

(b) *3:5-diiodo-4-(4'-methoxyphenoxy)-L-phenylalanine ethyl ester*

3:5-diamino-4-(4'-methoxyphenoxy)-L-phenylalanine ethyl ester hydrochloride (2 g.) was dissolved with stirring in a mixture of concentrated sulphuric acid (2.7 ml.) and glacial acetic acid (5.3 ml.) hydrogen chloride being evolved copiously. A solution of nitrosyl sulphuric acid was prepared by the careful addition of sodium nitrite (1. g.) to well-stirred concentrated sulphuric acid (6 ml.) and after cooling to <20° C. was diluted by the dropwise addition of glacial acetic acid (12 ml.). After further cooling to <5° C. the previously prepared solution of the diamine in acetic and sulphuric acids was added dropwise with vigorous stirring, the temperature being maintained at 0°–5° C. After stirring for a further ½ hour, urea (1 g.) was added and the bright red tetrazonium solution added in a very thin stream to a stirred solution of sodium iodide (4.0 g.) and iodine (3.5 g.) in water (65.0 ml.) and chloroform (75 ml.). The product formed a black gum which dissolved rapidly on the addition of more chloroform. Excess iodine was removed from the chloroform layer by washing with aqueous sodium metabisulphite and water. Removal of the solvent by distillation yielded a dark residue which was recrystallised from alcohol plus a small amount of concentrated hydrochloric acid yielding 1.9 g. of white needles of M. Pt. 203–4° C. $[\alpha]_D^{20} = +14°$ (½% in alcohol). The product contains chlorine and is probably the hydrochloride.

EXAMPLE 5

*3:5-diiodo-4-(4'-methoxyphenoxy)-N-benzoyl-L-phenylalanine ethyl ester*

3:5-dinitro-4-(4'-methoxyphenoxy)-N-benzoyl-L-phenylalanine ethyl ester (11.3 g.) dissolved in methanol (80 ml.) was reduced to the diamine by shaking under hydrogen at atmospheric pressure with 10% palladium on charcoal catalyst (0.85 g.). The catalyst was removed by filtration and the methanol evaporated under reduced pressure yielding the crude diamine as a hard gum. All attempts to crystallise this gum from a variety of solvents, met with failure even after prolonged refrigeration.

The crude diamine was dissolved in glacial acetic acid (20 ml.) and tetrazotised at a temperature <5° C., by dropwise addition to a well stirred and cooled solution of sodium nitrite (4.5 g.) in concentrated sulphuric acid (31.3 ml.) which had previously been diluted by the addition of a mixture of glacial acetic acid (63 ml.) and concentrated sulphuric acid (10 ml.). After stirring for a further half hour the tetrazonium solution was added in a thin steam to a stirred solution of sodium iodide (20 g.), urea (2.5 g.) and iodine (16.8 g.) in water (325 ml.) and chloroform (65 ml.). The chloroform layer was separated and free iodine removed by washing with aqueous sodium metabisulphite solution. After water washing and removal of the solvent by distillation, the crude product was obtained as a dark red gum. The crude gum was purified by chromatography through a charcoal bed, in benzene solution. Removal of the major portion of the benzene and crystallisation from benzene/petroleum ether (60–80°) yielded the pure product as white needles (7.4 g. 50%) of M. Pt. 139–140° C. Found: C, 44.4; H, 3.43; N, 2.14; I, 37.6. $C_{25}H_{23}O_5NI_2$ requires C, 44.7; H, 3.68; N, 2.09; I, 37.8 $[\alpha]_D^{20}=+41°-(1\%$ in chlorobenzene).

EXAMPLE 6

3:5-diamino-4-(4'-benzoyloxyphenoxy)-N-acetyl-L-phenylalanine ethyl ester

3:5-dinitro - 4 - (4' - benzoyloxyphenoxy) - N-acetyl-L-phenylalanine ethyl ester (25 g.) was reduced to the diamine as described under 3:5-diiodo - 4 - (4' - methoxyphenoxy) - N - benzoyl-L-phenylalanine ethyl ester. The crude dark red gum obtained was recrystallised several times from alcohol to yield colourless crystals of the diamine (17.5 g. 78%) of M. Pt. 140° C. softening at 110° C. Found: N, 8.82. $C_{26}H_{27}O_6N_3$ requires N, 8.81. $[\alpha]_D^{20}=+46°-(1\%$ in chloroform).

3:5-diiodo-4-(4'-benzolyoxyphenoxy)-N-acetyl-L-phenylalanine ethyl ester (I) *With the use of acetic acid in the tetrazotisation.*—3:5 - diamino - 4 - (4' - benzoyloxyphenoxy)-N-acetyl-L-phenylalanine ethyl ester (5 g.) was converted to the corresponding diiodo compound in an identical manner to that described in the preparation of 3:5-diiodo-4-(4'-methoxyphenoxy)-N-benzoyl - L - phenylalanine ethyl ester. The required diiodo compound crystallised as white needles (5.0 g. 68%) of M. Pt. 157° C. Found: C, 44.5; H, 3.26; N, 2.01; I, 35.9. $C_{26}H_{23}O_6NI_2$ requires C, 44.6; H, 3.29; N, 2.00; I, 36.3 $[\alpha]_D^{20}=+54°-(1\%$ in chlorobenzene).

(II) *With the use of phosphoric acid in the tetrazotisation.*—3:5-diamino-4 - (4' - benzoyloxyphenoxy)-N-acetyl - L - phenylalanine ethyl ester (5 g.) was converted to the corresponding diiodo compound in a similar manner to (I) above with the use of similar quantities of phosphoric acid in place of the glacial acetic acid. The product crystallised as white needles (3.2 g. 44%) of M. Pt. 156°. Found: C, 44.5; H, 3.31; N, 2.00; I, 36.8. $C_{26}H_{23}O_6NI_2$ requires C, 44.6; H, 3.29; N, 2.00; I, 36.3. $[\alpha]_D^{20}=+50°$ (1% in chlorobenzene).

EXAMPLE 7

3:5-diiodo-4-(4'-acetoxyphenoxy)-N-acetyl-L-phenylalanine ethyl ester

3:5 - dinitro - 4 - (4' - acetoxyphenoxy) - N-acetyl-L-phenylalanine ethyl ester (2.9 g.) was reduced to the 3:5-diamine as described in Example 6. The crude product was recrystallised from alcohol yielding colourless needles (1.9 g.) of M. Pt. 110° C. after softening at 90° C.

A solution of nitrosylsulphuric acid was prepared by the addition of sodium nitrite (0.9 g.) to well-stirred concentrated sulphuric acid (5. ml.) and cooled to <5° C. The solution was diluted by the addition of phosphoric acid (3. ml.) and a solution of the reduction product obtained from above (1.75 g.) in phosphoric acid (7 ml.) added dropwise at a temperature <5° C. Stirring was continued for a further half hour and urea 0.5 g. added. The dark orange tetrazonium solution was added dropwise to a well-stirred solution of sodium iodide (3.5 g.) and iodine (3.1. g.) in water (57 ml.) covering a layer of chloroform (20 ml.). The chloroform layer was separated, washed with a 10% solution of sodium metabisulphite to remove excess iodine, and evaporated to dryness yielding a pale yellow gum which refused to crystallise from any of the common solvents. The dry gum had the following analysis: M. Pt. 85° C. (softens at 75°). $[\alpha]_D^{20}=+55°$ (½% in chlorobenzene). Found: C, 38.9; H, 3.47; N, 2.24; I, 40.4. $C_{21}H_{21}O_6NI_2$ requires C, 39.5; H, 3.29; N. 2.20; I, 39.8.

I claim:

1. A process for the preparation of 2:6-diiododiphenyl ethers of the general formula

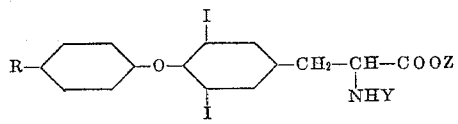

which comprises treating a diaminodiphenyl ether of the general formula

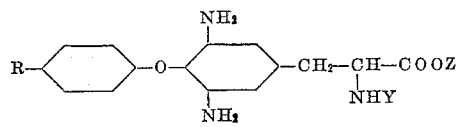

where Z is selected from the group consisting of hydrogen and an alkyl group containing not more than four carbon atoms, Y is selected from the group consisting of hydrogen and an acyl group and R is selected from the group consisting of alkoxy and acyloxy groupings in solution in an acid selected from the group consisting of glacial acetic acid and syrupy phosphoric acid, with concentrated sulfuric acid and an inorganic nitrite in the absence of water and decomposing the resulting tetrazo compound with an aqueous solution of an alkali metal iodide in the presence of a water immiscible organic solvent in which the 2:6-diiododiphenyl ether is soluble.

2. A process as claimed in claim 1 in which the diaminophenyl ether is 3:5-diamino-4-(4'-methoxyphenoxy)-N-benzoylphenylalanine ethyl ester.

3. A process as claimed in claim 1 in which the diaminophenyl ether is 3:5-diamino-4-(4'-methoxyphenoxy)-N-acetylphenylalanine ethyl ester.

4. A process as claimed in claim 1 in which the diaminophenyl ether is 3:5-diamino-4-(4'-methoxyphenoxy) phenylalanine.

5. A process as claimed in claim 1 in which the diaminophenyl ether is 3:5-diamino-4-(4'-methoxyphenoxy)-N-acetylphenylalanine.

6. A process as claimed in claim 1 in which the diaminophenyl ether is 3:5-diamino-4-(4'-acetoxyphenoxy) - N - acetylphenylalanine ethyl ester.

7. A process as claimed in claim 1 in which the decomposition of the tetrazo compound is effected by means of an aqueous solution containing sodium triiodide.

8. A process as claimed in claim 1 in which the inorganic nitrite is sodium nitrite.

9. A process as claimed in claim 1 in which said water immiscible organic solvent is selected from the group consisting of chloroform, tetrachloroethane, methylene dichloride, benzene, chlorobenzene and ethylene dichloride.

10. A process for the preparation of 3:5-diiodo - 4 - (4'-methoxyphenoxy)-N-acetylphenylalanine ethyl ester which comprises treating 3:5-diamino - 4-(4' - methoxyphenoxy) - N - acetylphenylalanine ethyl ester in solution in glacial acetic acid with concentrated sulfuric acid and sodium nitrite in the absence of water and decomposing the resulting tetrazo compound with an aqueous solution containing sodium triiodide in the presence of chloroform.

11. A process as claimed in claim 10 in which the L-isomer of the 2:6-diaminodiphenyl ether is used as the starting material.

12. A process for the preparation of 3:5-diiodo - 4 - (4'-methoxyphenoxy)-N-benzoylphenylalanine ethyl ester which comprises treating 3:5 - diamino - 4-(4'-methoxyphenoxy)-N-benzoylphenylalanine ethyl ester in solution in glacial acetic acid with concentrated sulfuric acid and sodium nitrite in the absence of water and decomposing the resulting tetrazo compound with an aqueous solution containing sodium triiodide in the presence of chloroform.

13. A process as claimed in claim 12 in which the L-isomer of the 2:6-diaminodiphenyl ether is used as the starting material.

14. A process for the preparation of L-2:6-diiododiphenyl ethers of the general formula

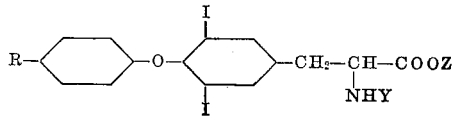

where Z is selected from the group consisting of hydrogen and an alkyl group containing not more than four carbon atoms, Y is selected from the group consisting of hydrogen and an acyl group and R is selected from the group consisting of alkoxy and acyloxy groupings, which comprises dissolving the L-isomer of the corresponding 2:6-diaminodiphenyl ether in a mixture of glacial acetic acid and concentrated sulfuric acid and adding the resulting solution to a solution of sodium nitrite in the said mixed acids in the absence of water, the reaction being carried out at a temperature between —5° and 20° C. and then decomposing the resulting tetrazo compound with an aqueous solution of sodium triiodide in the presence of chloroform.

References Cited in the file of this patent

UNITED STATES PATENTS

| Number | Name | Date |
|---|---|---|
| 2,422,938 | Turner et al. | June 24, 1947 |
| 2,459,540 | Rosenwald | Jan. 18, 1949 |
| 2,561,547 | Warren | July 24, 1951 |

OTHER REFERENCES

Niemann et al., Journal of American Chem. Society, vol. 63, 1549–1552 (1941). Attention is called to 3,5 - diiodo - 4-(3'-methoxy-phenoxy)-aniline on page 1551.